United States Patent [19]

Amstad

[11] Patent Number: 4,842,883
[45] Date of Patent: Jun. 27, 1989

[54] CONTINUOUS PRODUCE SURFACE TREATER AND METHOD

[76] Inventor: John H. Amstad, 10103 W. 96th Ter., Shawnee Mission, Kans. 66212

[21] Appl. No.: 142,908

[22] Filed: Jan. 11, 1988

[51] Int. Cl.$^4$ .................. A23L 1/216; A23N 7/02
[52] U.S. Cl. ........................... 426/483; 15/3.2;
99/516; 99/625; 99/626
[58] Field of Search .................. 99/625, 626, 629, 623,
99/516, 627, 630; 426/483; 15/3.2

[56] References Cited

U.S. PATENT DOCUMENTS

| | | | |
|---|---|---|---|
| 385,870 | 7/1888 | Melkersman | 210/253 |
| 1,230,001 | 6/1917 | Martenette | 99/625 |
| 1,702,992 | 2/1929 | Borer | 99/587 |
| 2,164,372 | 7/1939 | Anderson | 99/627 |
| 2,355,810 | 8/1944 | Loewy | 426/483 |
| 3,134,413 | 5/1964 | Dorsa et al. | 99/627 |
| 3,460,162 | 8/1969 | Sijbring | 426/483 |
| 3,566,942 | 3/1971 | Smith | 99/625 |
| 3,703,200 | 11/1972 | Palyi et al. | 426/483 |
| 3,734,752 | 5/1973 | Headley | 426/483 |
| 3,811,000 | 5/1974 | Lozzarini | 426/483 |
| 3,862,345 | 1/1975 | Westover et al. | 426/262 |
| 3,946,658 | 3/1976 | Smith | 99/627 |
| 4,023,477 | 5/1977 | Hirahara et al. | 99/585 |
| 4,062,985 | 12/1977 | Amstad | 426/483 |
| 4,068,574 | 1/1978 | Amstad | 99/587 |
| 4,132,162 | 1/1979 | Magnuson | 99/630 |
| 4,189,503 | 2/1980 | Giguere | 426/482 |
| 4,196,224 | 4/1980 | Falk | 426/483 |
| 4,230,034 | 10/1980 | Amstad | 99/587 |
| 4,258,069 | 3/1981 | Amstad | 426/483 |
| 4,394,398 | 7/1983 | Wilson | 426/481 |
| 4,437,398 | 3/1984 | Savi | 99/587 |
| 4,448,118 | 5/1984 | Kunz | 99/624 |
| 4,519,305 | 5/1985 | Vanosdall | 99/625 |

OTHER PUBLICATIONS

Food Engineering, p. 142. May 1984.

*Primary Examiner*—Wilbur Bascomb
*Attorney, Agent, or Firm*—Litman, McMahon & Brown

[57] ABSTRACT

An apparatus and method for continuously peeling and removing dirt from produce wherein the apparatus comprises an abrading cage with a plurality of rotating spindles and having an internal chamber with an inwardly facing abrading surface and an axis of rotation. The axis of rotation of the cage is generally horizontally aligned, as opposed to being vertically aligned so as to vary the combined force due to gravity and centrifugal force acting upon produce within the cage. The cage is rotated at sufficient speed to substantially maintain the produce in contact with the abrading surface during revolution thereof yet the combined force acting upon the produce varies throughout the revolution so as to prevent clustering and bridging. A peel and dirt collecting drum diverges from one end to a wide end, is rotated and is positioned radially outward from the cage and has a surface thereon positioned to receive debris flung outwardly from the cage. Fingers are mounted on an end wall supporting the spindles and extend from near a discharge mouth thereof over nips between each adjacent pair of spindles. The apparatus includes adjustable legs to vary the attitude of the cage axis of rotation. A water spray is positioned within the cage to reduce dust when necessary, and allow cleaning of the apparatus.

16 Claims, 7 Drawing Sheets

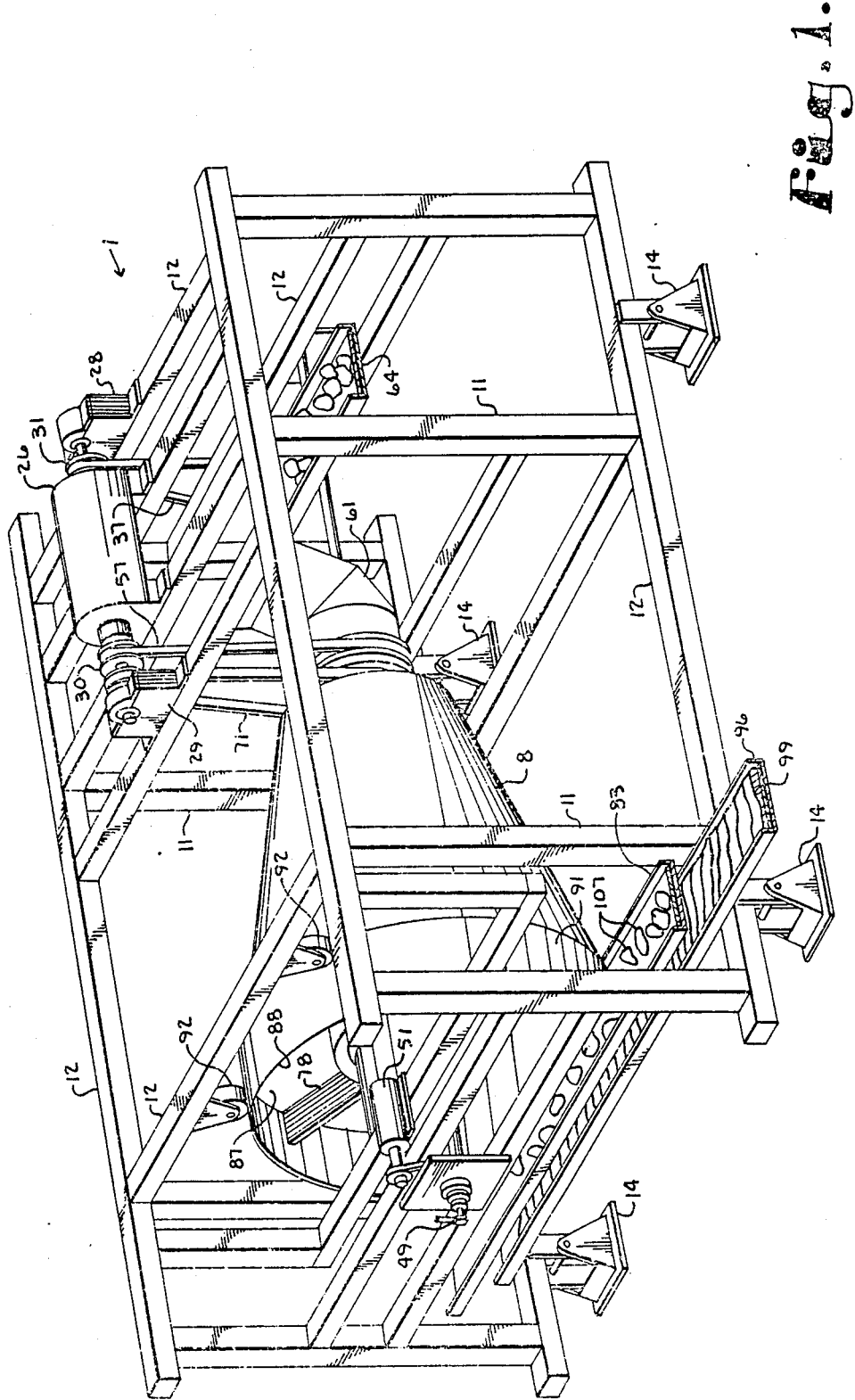

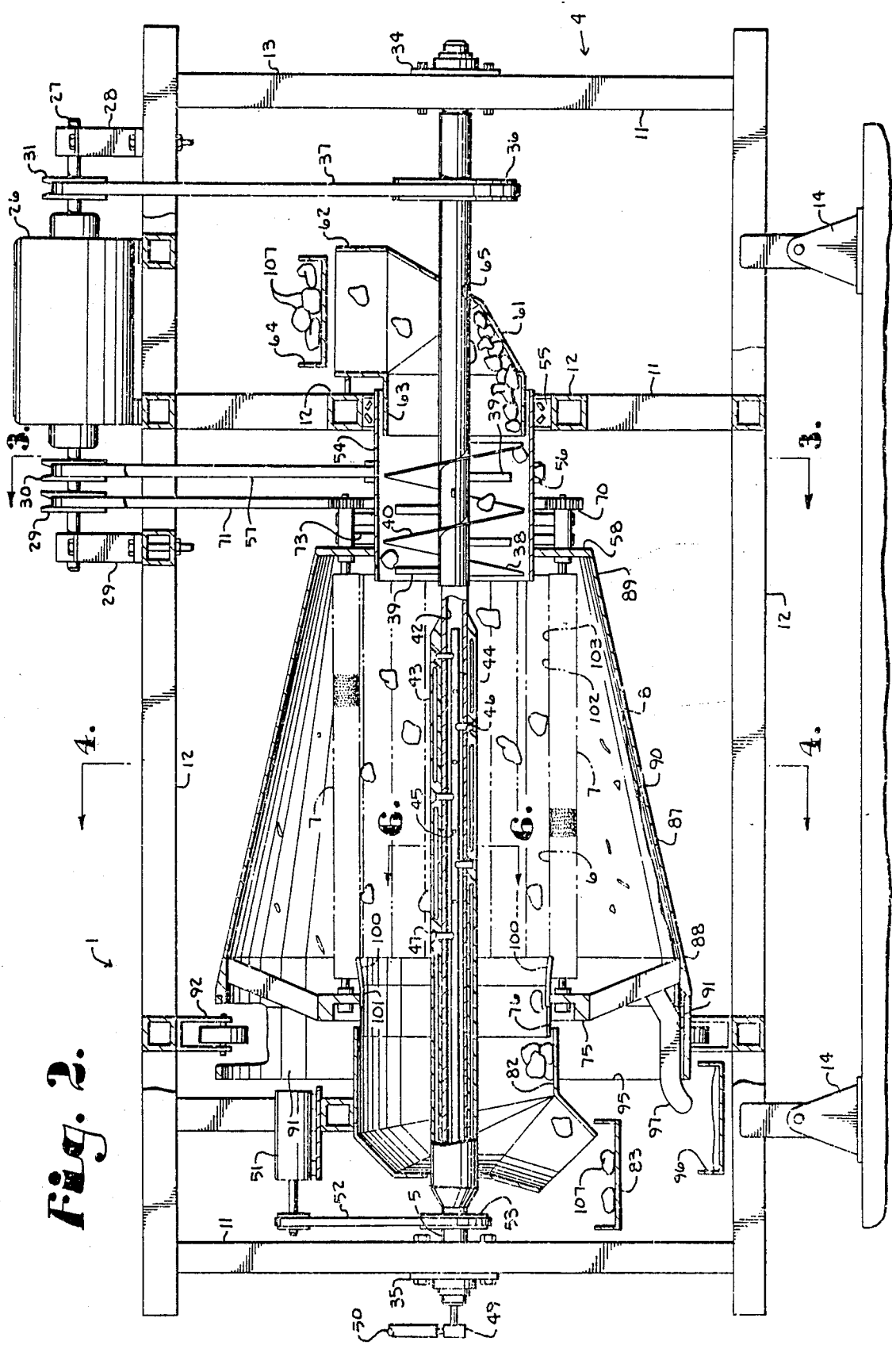

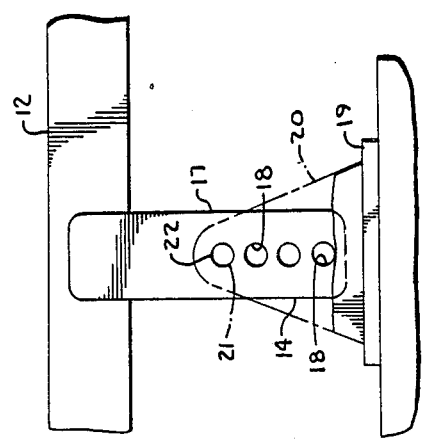
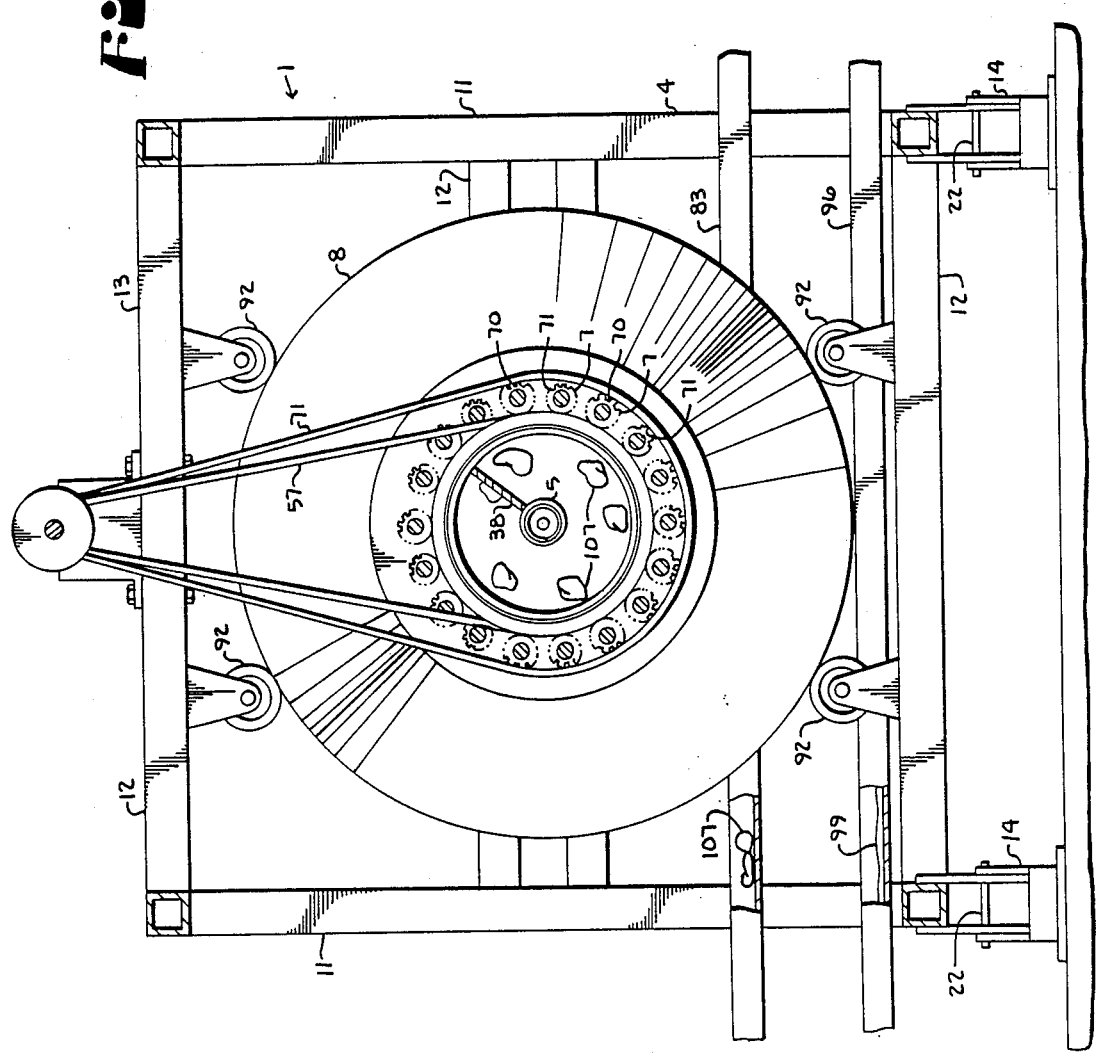

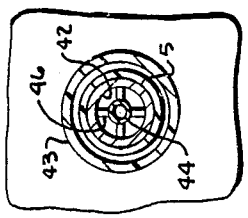
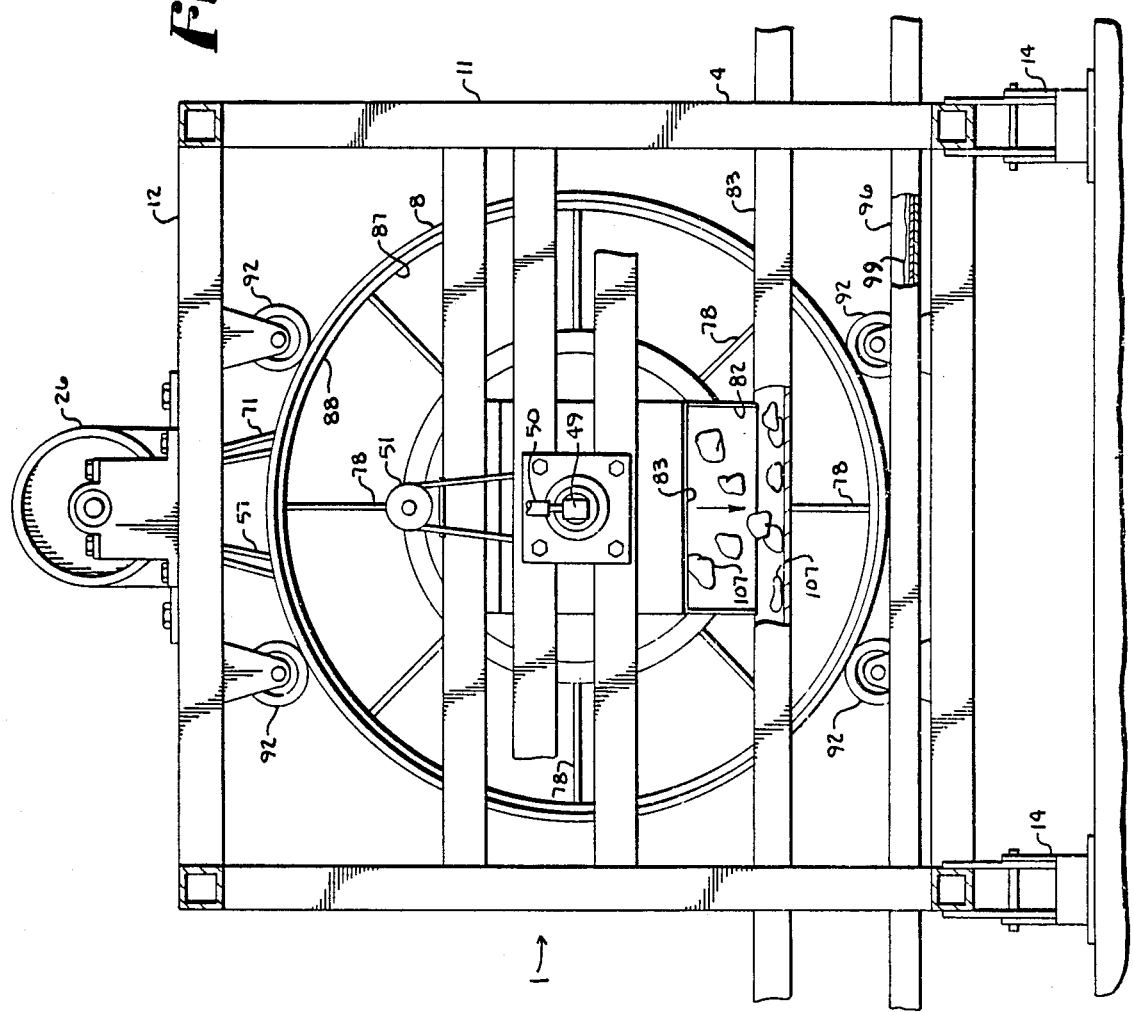

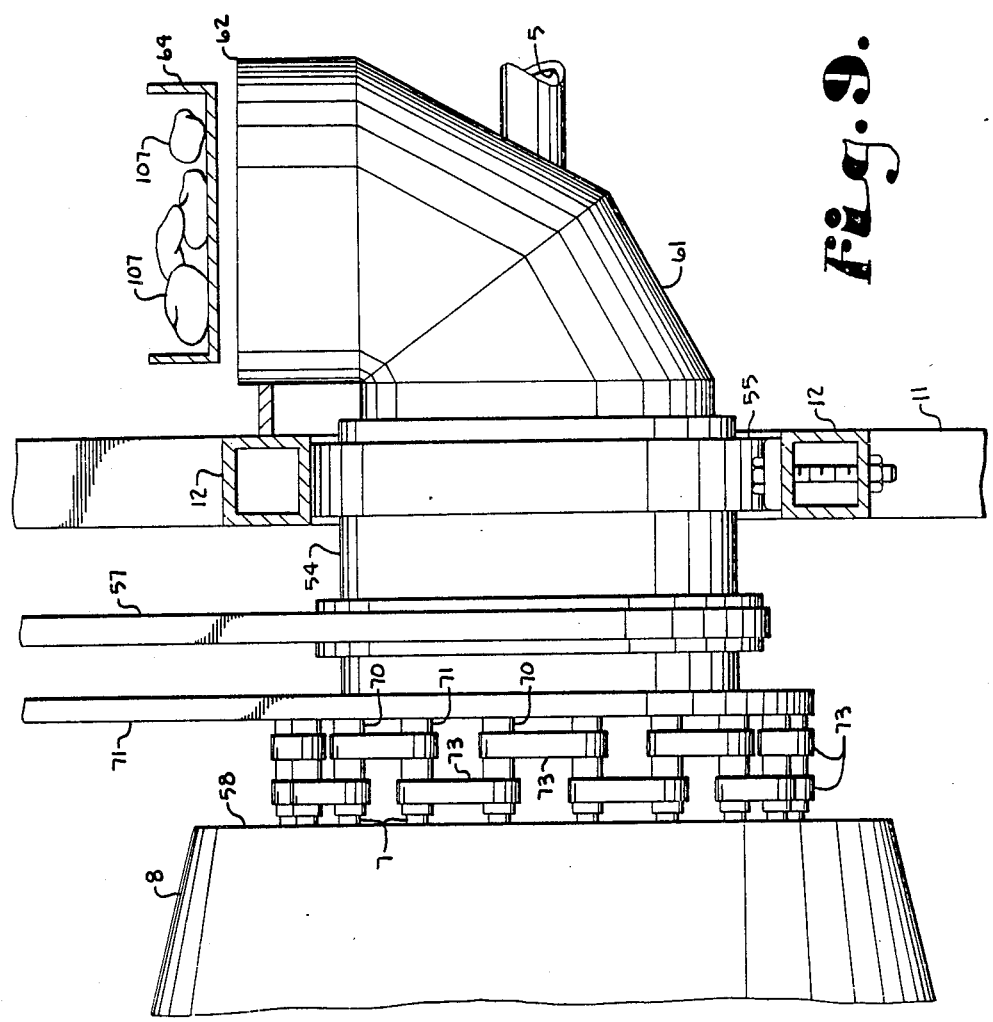

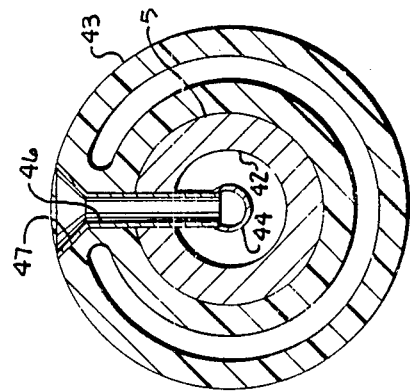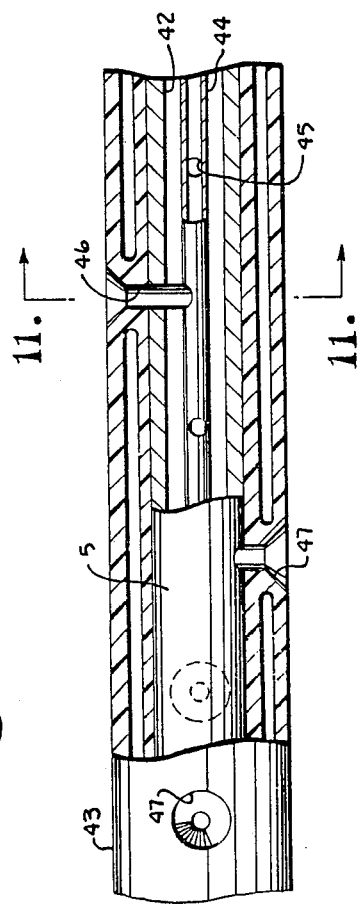

CONTINUOUS PRODUCE SURFACE TREATER AND METHOD

BACKGROUND OF THE INVENTION

The present invention relates to machines for cleaning and/or peeling various fruits and vegetables (produce) by rotating the produce in a drum with sufficient velocity to drive the produce outwardly against a cleaning/abrading surface, spindles or the like.

It has long been recognized that the cleaning and/or peeling of produce at a high rate with minimal waste and handling damage is important in the food processing industries. Attempts to accomplish this have presented difficult problems due to many factors, including the highly irregular surfaces of certain produce, such as potatoes, the substantial variation in optimum abrasive surface pressure for different types of produce, the susceptibility of some produce to handling damage, differences in epidermis characteristics of different produce types and different species of the same type, the ever increasing difficulties in disposing of waste wash water and treating chemicals and the recent substantial increase in the cost of energy for producing steam, hot water or radiant heat for certain related operations.

High capacity produce peeling and cleaning devices have been utilized for many years, as exemplified in U.S. Pat. Nos. 2,355,810 and 3,811,000. Such devices relied upon gravitational tumbling of produce groups in a peeling cage constructed of elements with an abrasive surface and having a revolving auger therein for moving the tumbling groups therealong. A new concept was presented in U.S. Pat. Nos. 4,062,895 and 4,068,574 wherein the peeling cage accelerated the produce to a rotary speed sufficient for maintaining the produce in continuous contact due to centrifugal force against a rotating spindle abrading surface. This greatly improved the potential cleaning and/or peeling efficiency by presenting a manyfold increase in active abrasive surface area within the cage along with the pressure acting on the produce, while also permitting highly accurate control of produce pressure thereagainst by merely varying the cage speed. Further, the new arrangement reduced the likelihood of produce damage by substantially decreasing tumbling.

Further improvements upon the prior art were presented in applicant's U.S. Pat. Nos. 4,230,034 and 4,258,069. The difficulty in accurately controlling the residence time of produce within the treating cage was overcome by the introduction of an auger or spiral fall inhibiting arrangement. The auger was used to resist or retard the gravitationally induced downward travel of the produce. In addition, certain variations of the abrasive surface were incorporated to provide for efficient and appropriate treatment of a great variety of fruits and vegetables.

Although the improved methods and apparati disclosed in U.S. Pat. Nos. 4,230,034 and 4,258,069 were marked improvements over prior devices, some difficulty was experienced in controlling certain products flowing through the machine. In particular, produce was sticking, bunching, bridging or clustering in certain spots, if a steady centrifugal force was applied. Additional product flow problems sometimes resulted from the spindles corotating at the same speed and, in particular, spherical or cylindrical shaped produce had a tendency to spin and not be abraded as desired.

SUMMARY OF THE INVENTION

The present invention provides a produce surface treating apparatus and method in which produce is rotated in a cage and urged against a cleansing or abrading surface or spindle. Centrifugal force is utilized to bias the produce against the abrading spindles. For example, for some produce, the cage is rotated sufficiently fast to exert about 5 gs against the produce, if the cage were rotating about a vertical axis. Produce is prevented from bunching, bridging or clustering by using a substantially horizontal oriented axis for product flow so as to provide a continuously varying force of plus and minus 1 g from the centrifugal force acting on the produce (that is, the centrifugal force minus 1 g when going upward and plus 1 g when going downward, thus where the cage rotation would exert 5 gs, if no gravity were present, the net effect on the produce is to have a variance of from 4 to 6 gs thereon during a complete revolution. Variance of the force alleviates the detrimental tendency of produce to cluster that occurs when a steady radially directed force is applied, as when rotating about a vertical axis structure. Further, alternate spindle speeds may be applied by using sprockets or pulleys having alternate gear ratios. The alternate spindle speeds prevent the produce from spinning for optimum abrading. Under circumstances where the produce is extremely prone to clustering, the rotational speed is reduced and may even fall below the speed required to apply at least one g centrifugal force to the produce throughout an entire revolution. In this manner, the produce will fall away from the wall for a short period, thereby assisting in distributing of the produce, but this may increase residence time required, and therefore, slow throughput. (For example, the centrifugal force may be one-half g to such that the total outward force acting on the produce varies from one and one-half to negative one-half g.)

Residence time in the treating cage is controlled by varying the angle of axis of rotation of the cage relative to horizontal, by use of rotating spindles that retard or improve the flow of produce through the apparatus and/or by use of baffles at various locations such as the cage discharge to retard exit of produce. When using spindle bristles which are vertical with respect to directing the produce through the apparatus, the axis of the cage may often be aligned from 0° to 2° from the horizontal (raised at the inlet as compared to the outlet) to effectively provide sufficient residence time. When bristles which retard or accelerate the produce are used, plus 5° to minus 5° from horizontal, although this may vary substantially with the type of production.

Fingers are provided between the ends of the spindles and the wall supporting the spindles to prevent produce from being damaged by being wedged therebetween. Centrally located in the cage is a rotatable shaft with a surrounding sleeve of soft material to reduce damage to produce that is inadvertently flung across the cage. The shaft also includes a water dispensing tube to provide a water mist where needed to control dust.

A collecting drum is provided exterior of the cage and spindles. As the abrading spindles clean and peel the produce during rotation, dirt and peelings are deposited on the interior wall of the drum. The drum is conical in shape and rotated so as to urge the peeling and dirt to the wider end thereof whereat such is discharged into a waste conveyor.

OBJECTS OF THE INVENTION

The principal objects of the present invention are: to provide an improved high capacity produce cleaning and/or peeling apparatus; to provide a method of treating produce with such an apparatus; to provide such an apparatus and method which permits accurate control of residence time in a centrifugal type and spindle abrading treating cage; to provide such an apparatus and method which allows optimum utilization of surface treating area and pressure; to provide such an apparatus and method wherein produce having irregular shapes, and particularly various elongated shapes, are properly oriented with respect to abrading spindles for efficient treatment with minimum waste; to provide such an apparatus and method which more fully utilizes a continuous flow, centrifugal force treating cage for high production rates; to provide such an apparatus and method wherein the cage is rotated about a generally horizontal axis to additively apply the force due to gravity to the centrifugal force applied to the produce and, thereby, vary the overall force applied to the produce to reduce clustering, bunching and bridging; to provide such an apparatus and method wherein a diverging drum surrounds the cage such that peelings and dirt are flung against the drum and the drum is rotated such that the peelings and dirt are urged to the diverging end thereof; to provide such an apparatus and method wherein fingers are provided between adjacent spindles and the end wall supporting the spindles to reduce the likelihood of produce becoming wedged therebetween and damaged; and to provide such a treating system and method which is positive in function, economical in operation and extremely well adapted for its intended purpose.

Other objects and advantages of this invention will become apparent from the following detailed description taken in connection with the accompanying drawings wherein are set forth by way of illustration and example certain embodiments of this invention.

The drawings constitute a part of this specification and include exemplary embodiments of this invention for illustrating various objects and features thereof.

BRIEF DESCRIPTION OF THE DRAWINGS

FIG. 1 is a perspective view of a continuous produce cleaning and/or abrading apparatus in accordance with the present invention.

FIG. 2 is an enlarged cross-sectional view of the apparatus from one side thereof, showing a support structure, a waste catching drum, an abrading cage with spindles and a central shaft.

FIG. 3 is an enlarged cross-sectional view of the apparatus, taken along 3—3 of FIG. 2.

FIG. 5 is an enlarged rear end view of the apparatus.

FIG. 6 is an enlarged and fragmentary cross-sectional view of the central shaft of the apparatus, taken along line 6—6 of FIG. 2.

FIG. 7 is an enlarged and fragmentary side elevational view of an adjustable support leg for the apparatus.

FIG. 9 is an enlarged and fragmentary side elevational view of the apparatus, showing detail of a conveyor, a chute and a drive mechanism for a front end of the drum and the cage.

FIG. 10 is an enlarged and fragmentary side elevational view of the central support shaft of the apparatus, with portions thereof broken away to show interior detail.

FIG. 11 is an enlarged and fragmentary cross-sectional view of the central shaft of the apparatus, taken along line 11—11 of FIG. 10.

DETAILED DESCRIPTION OF THE INVENTION

Figure 8:
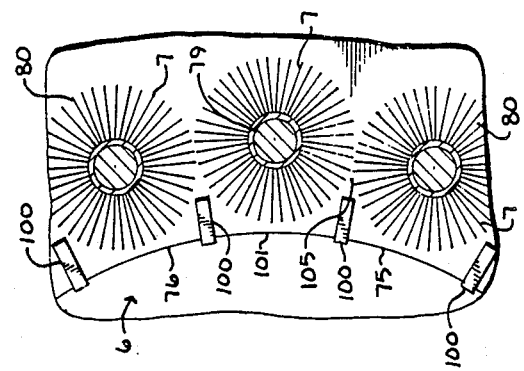
FIG. 8 is an enlarged and fragmentary front end view of the cage and the spindles of the apparatus and also showing fingers between the spindles and support wall thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a continuous produce surface treater apparatus in accordance with the present invention. The apparatus 1 is for removing peelings and the like from various fruits and vegetables (produce). The apparatus 1 comprises a support frame 4, a central shaft 5 rotatably mounted upon the frame 4, a produce abrading cage 6 radially spaced from the shaft 5 and including rotating spindles 7, and a rotating peeling and dirt drum 8 radially spaced from and around the cage 6.

The support frame 4 comprises a plurality of vertical members 11 and horizontal members 12 fixedly joined together to form a rigid and generally rectangular shaped structure 13 supported by four adjustable legs near oppositely spaced lower corners of the structure 13.

Each of the legs 14, as seen in FIG. 7, include a depending strut 17 fixedly attached to the lower side of the structure 13 and having a plurality of apertures 18 vertically spaced therealong. Each of the legs 14 also include a foot 19 having opposed upwardly projecting and triangularly shaped members 20, with each of the members 20 having an aperture 21 near the top thereof. The apertures 21 of paired members 20 are coaxially aligned and receive therethrough a pivot bar 22 which is also selectively received through apertures 18 in the paired struts 17. In this manner, the foot 19 is pivotally connected to a pair of struts 17 and the struts 17 and, consequently, the entire structure 13, are adjustable relative to the feet 19 by selective placement of the pivot bars 22. The feet 19 pivot on the bars 22 to lie flat on a supporting surface while supporting the apparatus 1 whether the axis of the cage 6 is exactly horizontally aligned or somewhat angled relative to horizontal (as used herein, the term "generally horizontal" means closer to horizontal than vertical and normally within 5° of horizontal). In this manner, the structure 13 may be aligned horizontally or alternatively the front or rear legs 14 may be adjusted to raise or lower the front or produce entrance (to the right in FIG. 2) of the structure 13 relative to the rear thereof so as to accelerate or retard respectively the speed of the produce passing through the apparatus 1.

The support frame 4 has mounted thereon motor means such as the illustrated electric motor 26 for driving various parts of the apparatus 1. The motor 26 includes an output shaft 27 supported at opposite ends thereof by pillow blocks 28 and 29. Mounted on the motor output shaft 27 are three pulleys 30, 31 and 32, each of which may be selectively adjusted to vary the effective radius thereof relative to a drive belt being driven thereby.

The central shaft 5 is rotatably mounted upon the support frame 4 and, in particular, is mounted in bearings 34 and 35 so as to be rotatable about an axis thereof. Attached to an auger member 40 sleeved on the central shaft 5 is a drive pulley 36 which is connected by a drive belt 37 to motor driven pulley 31. The auger member 40 has flighting 38 extending therefrom. The flighting 38 is rotatable independent of the shaft 5. Further, the auger member 40 has flexible strips or flaps 39 radially extending outwardly therefrom and spaced between segments of the flighting 38. The purpose of the flighting 38 and flaps 39 will be discussed below.

The central shaft 5 further includes a central chamber 42 extending from near the bearing 35 to at least near the flighting 38. Surrounding the shaft 5 in the region exterior of the chamber 42 is a buffeting pad 43 of relatively soft or flexible material such as foam rubber or an air pressurized tube to prevent damage to produce inadvertently flung against the shaft 5 during operation of the apparatus 1. It is foreseen that an elongate, circular and air pressurized tube may be used for this purpose and helically wound about the shaft 5. Such a tube may also be used to fill a portion of the chamber 42 so as to further urge produce against the spindles 7 and to prevent the produce from bouncing. In a similar manner, it is foreseen that the central shaft may include an outward extending brush to urge the produce against the spindles 7, to inhibit produce bouncing and to reduce spinning of especially round produce. The chamber 42 includes therein a tube 44 having a plurality of apertures 45 therealong. The apertures join with side conduits 46 which open exteriorly of the shaft 5 through spray apertures 47. The tube 44 is connected at one end thereof with a rotary connection 49 to a water supply hose 50. The hose 50 is further connected to a water source (not shown). In this manner, when water is supplied to the hose 50, the water passes through the tube 44 and, subsequently, through the apertures 47 to be sprayed radially outward from the central shaft 5.

The shaft 5 is rotatably driven by a motor 51 mounted on the frame 4 and through a drive belt 52 and pulley 53 fixed to and surrounding the shaft 5 so as to rotate therewith.

Mounted on the right side of the drum 8, as seen in FIG. 2, is a cylindrical sleeve 54. The sleeve 54 has a diameter which is slightly larger than the effective diameter of the flighting 38 and is coaxial with the central shaft 5 such that rotation of the central shaft relative to the sleeve 54 allows for free movement of the flighting 38 within the sleeve 54. The sleeve 54 is mounted at one end thereof in a bearing 55 that is, in turn, mounted upon the support frame 4. A pulley 56 is secured to the exterior of the sleeve 54 and is connected with the motor pulley 30 by a drive belt 57 such that the sleeve 54 and, consequently, the drum 8 may be rotated thereby. Mounted on the sleeve 54 near the left hand side thereof, as seen in FIG. 2, is a radially outward extending wall 58.

Connecting with the feed, entrance or right hand side of the sleeve 54, as seen in FIG. 2, is a feed chute 61. The feed chute 61 has a first end 62 which opens generally upwardly and beneath the discharge of produce feed conveyor means, such as the illustrated conveyor 64. The chute 61 has an opposite end 63 which is inserted within the sleeve 54 such that the sleeve 54 freely rotates thereabout. The chute 61 is supported by the support frame 4 so as not to rotate with the sleeve 54. The chute 61 includes an aperture 65 to allow passage of the central shaft 5 therethrough.

The abrading cage 6 comprises a plurality of generally equally spaced spindles 7. In the illustrated embodiment, there are eighteen spindles 7 although the number, diameter and material as well as the relative rates of rotation of the spindles 7 compared to one another may be modified depending upon the type of produce being treated by the apparatus 1. In order to prevent produce from becoming stagnant, clustered or simply spun by along with the spindles 7 and to improve efficiency of the apparatus 1, adjacent spindles 7 are often rotated at different rates of revolution by modification of pulleys driving the spindles 7.

In particular, as can be best seen in FIGS. 2 and 9, every other spindle 7 has a coaxially rotating drive sleeve or driven pulley 70 attached to the right hand side thereof. Each driven pulley 70 is, in turn, mounted so as to be driven, at least during part of a revolution, by a drive belt 71 that is, in turn, driven by the motor pulley 29. Each driven pulley 70 interconnects with adjacent non-directly driven pulleys 72 projecting from ends of adjacent spindles 7 by connecting belts 73. By selective modification of gear ratio between the pulleys 70 and 72, the respective rates of rotation of adjacent spindles 7 may be modified. For example, they may be rotated in a ratio of three to two.

Each of the spindles 7 is mounted so as to be rotatable within the wall 58 on one side thereof and likewise within a wall 75 on the other side thereof. The wall 75 is mounted within the drum 8 and has a large central mouth 76 of approximately the same diameter as the interior of the cage 6 formed by the spindles 7. The wall 75 has radially outward projecting struts 78 which are fixedly attached to the interior of the drum 8 and, as is seen in FIG. 5, are of substantially thin cross-sections so as to allow flow of peelings thereby, as will be discussed later.

Each of the illustrated spindles 7 include a central shaft 79 and radially extending bristles or a similar abrading material 80. The abrading material 80 may be modified, as is necessary, to allow for variance in types of produce.

Communicating with the mouth 76 but not rotating therewith is a second chute 82. The chute 82 has a first end 83 with a diameter that is approximately equal to the diameter of the mouth 76 and interior of the cage 6. The chute 82 has a second discharge end 83 which discharges treated produce onto a second conveyor means such as finished product conveyor 83 for transfer to a storage location (not shown).

The drum 8 comprises a shell 87 having the shape of a truncated cone. That is, the drum 8 diverges from a narrow end 89 to a wide end 88 thereof and has inwardly directed cage facing surface 90. A suitable angle of divergence has been found to be within the range of 10° to 20° and the illustrated embodiment has an angle of about 13°, although it is foreseen that other angles will provide satisfactory discharge under certain rotational speeds and with certain waste produce consistencies. The widest end 88 of the shell 87 is aligned with the mouth 76 and is connected to the cage 6 by the struts 78. The narrowest end 89 of the shell 87 is fixedly attached to the outermost periphery of the wall 58. The shell wide end 88 is attached to a relatively narrow cylindrical sleeve 91. The sleeve 91 rides on a plurality of trundle wheels 92 that are, in turn, mounted upon the frame 4 so as to allow rotation of the drum 8. The left hand side of the sleeve 91, as seen in FIG. 2, forms a circular discharge 95 that is positioned overed a third conveying means which in the present embodiment is illustrated as conveyor 96 for transfer of peelings and dirt away from the apparatus 1. A scraper 97 is attached to a lower strut 78 to guide the peelings and dirt 99 to the conveyor 96.

Figure 4:
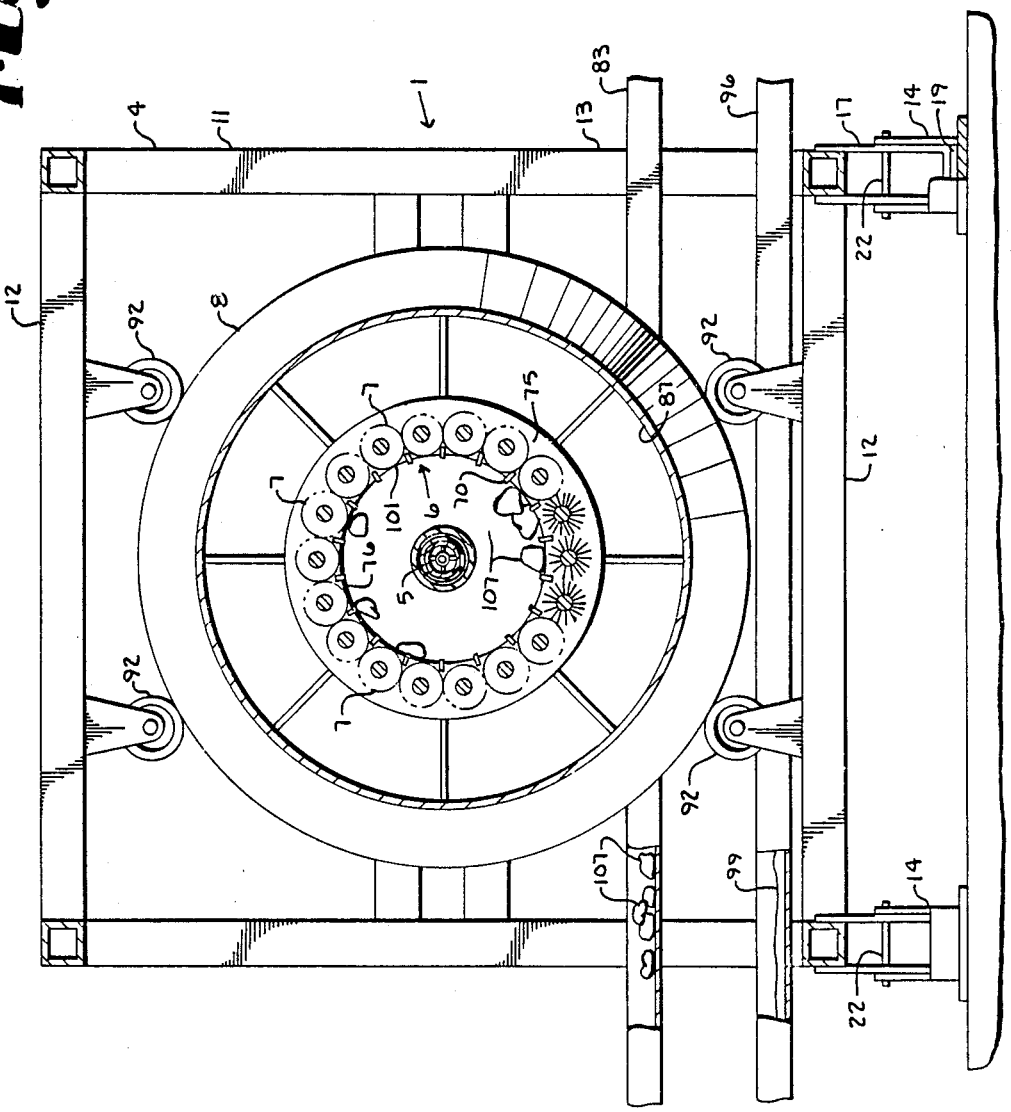
FIG. 4 is an enlarged cross-sectional view of the apparatus, taken along 4—4 of FIG. 2.

Shown in FIG. 4 and especially in FIG. 8 are fingers 100. The fingers are attached to the wall 75 and, in particular, to a periphery or circumferential edge 101 thereof defining the mouth 76. The mouth 76 communicates with an interior chamber 102 of the cage 6 formed by abrading surface 103 comprising the radially inward facing surfaces of the spindles 7. Each of the fingers 100 extend from near the edge 101 over a portion of a nip 105 formed between two adjacent pairs of spindles 7 near the discharge end thereof. In this manner, the fingers 100 function as a bridge between the spindles 7 and the wall 75 to prevent produce, such as the illustrated potatoes 107, from being wedged between the spindles 7 and the wall 75.

In use, produce, such as the illustrated potatoes 107, are conveyed by conveyor 64 into the feed chute 61. From the chute 61, the potatoes 107 are metered by the auger menber 40 which is rotated between approximately 10 and 500 revolutions per minute depending upon the type of produce being treated. The flaps 39 help control the flow of produce along the flighting 38 and prevent extensive bouncing or the like. The produce is discharged from the flighting 38 into the cage chamber 102.

The cage 6 and drum 8 are is rotated in a range of preferably from about 120 and 1000 revolutions per minute, again depending upon the type of produce being treated. The higher the rate of revolution, the greater the centrifugal force biasing the produce against the abrading surface 103 and, consequently, the greater the abrasion. For heavy skinned produce, a greater rate of revolution or longer residence time is necessary and for light skinned produce a relatively low rate of revolution or short residence time is necessary. It is preferable to keep the rate of revolution at least sufficiently high to provide a centrifugal force acting against the produce which is at least greater than the force of gravity so that the produce will be urged against the abrading surface 103 during the entire revolution of the cage 6. However, for some produce which has a strong tendency to cluster, the rotational speed may be reduced, even to the point of producing a centrifugal force of less than one g. In this manner, the produce separates from the wall during a portion of a revolution, but this may increase residence time and may also lead to damage of the produce.

In certain situations, the cage 6 may be aligned such that the axis of rotation of the cage 6 is essentially horizontal. Under certain feed circumstances, an exactly horizontal axis of rotation will provide correct residence time for a particular type of produce. On the other hand, for certain produce, the residence time may necessarily need to be less or greater than a precisely horizontal axis of rotation would provide and, therefore, the axis may be varied some degrees relative to horizontal.

It has been found for most produce that modification of the angle of the axis of rotation of the cage 6 within the range of from 0° to 2° from horizontal is normally sufficient to control residence time, when the spindles 7 have a generally neutral directing surface or texture associated therewith. When the spindles 7 have a helically shaped surface, when the bristles thereof are non-radially aligned, or the like, the spindles may be produce flow directing and either tend to retard or accelerate produce flow through the cage 6. Under these conditions, the axis of rotation of the cage 6 may necessarily be modified from the horizontal (for example, plus or minus five degrees) in order to produce the desired residence time for the particular produce being treated. The modification of the axis of rotation of the cage 6 is accomplished by adjustment of the legs 14 to tilt the entire apparatus 1 as necessary.

The central shaft 5 includes a water system which may be selectively activated to spray water interior of the cage 6 to reduce dust. More importantly, the water spray may be used after processing is complete to allow the operator to clean the apparatus 1 without disassembling same.

The produce after being treated within the cage 6 and having peelings and dirt removed therefrom, is discharged through the mouth 76 and into the discharge chute 82. After passing through the discharge chute 82, the produce is conveyed by conveyor 83 to storage. The peelings and dirt removed by the abrading surface of the spindles 7 are thrown or flung radially outward toward the drum 8 and impinge upon the interior surface 90 thereof. The drum 8 is rotated by the motor 26 and as the interior surface of the drum 8 diverges toward the wide end 88 thereof, the peelings and dirt are urged along the surface 90 of the drum 8 toward the wide end 88 to the discharge aperture 95 and flow over the discharge aperture 95 into the conveyor 96 which transfers the peelings and dirt 99 to a discharge location. It is noted that the feed auger flighting 38, spindles 7 and cage 6 (with the drum 8) are each independently rotated at a different rate of revolution which is dependent upon characteristics of the particular produce being treated thereby. For example, it has been found that for a certain type, size and shape of potato, the following rates of revolution are appropriate: 100 rpm for the feed auger member 40, 1000 rpm for the spindles 7, 170 rpm for the cage 6 and drum 8.

It is to be understood that while certain forms of the present invention have been illustrated and described herein, it is not to be limited to the specific forms or arrangement of parts described and shown.

What is claimed and desired to be secured by Letters Patent is as follows:

1. An apparatus for removing dirt and peelings from produce; said apparatus comprising:
   (a) a support frame;
   (b) a cage rotatably mounted to rotate about a generally horizontal axis and supported by said frame; said cage having an interior chamber and an abrading surface facing said chamber for engaging the produce;
   (c) rotating means rotating said cage, when said apparatus is operating, at a rotary speed sufficient to apply a centrifugal force at said surface that is at least greater than the force of gravity during the entire rotation of said cage such that produce, when in said rotary cage is urged against said surface during substantially the entire revolution of said cage and further such that the combined forces acting at said surface due to centrifugal and gravity forces varies substantially during each rotation, thereby reducing clustering of produce on said surface;

(d) feeding means for urging produce into said cage chamber; and (e) discharge means for transferring produce from said cage after being treated therein.

2. The apparatus as set forth in claim 1 including:
(a) a waste drum radially spaced outward from said cage; and wherein
(b) said abrading surface includes a plurality of spindles mounted so as to be rotatable within said cage and so as to discharge dirt and peelings removed from said produce radially outward and onto said drum; and including
(c) spindle rotation means.

3. The apparatus as set forth in claim 2 including:
(a) drum rotation means rotating said drum; and wherein:
(b) said drum has an interior surface that diverges from one end thereof to an opposite wide end thereof such that, when said drum is rotated with material including dirt and peelings thereon, said material is urged toward and discharged from said wide end.

4. The apparatus according to claim 3 wherein:
(a) said drum comprises a shell in the shape of a truncated cone; and including
(b) waste discharge means cooperating with said drum wide end and adapted to receive the material and convey the material from said apparatus.

5. The apparatus as set forth in claim 1 including:
(a) a feed control member comprising an auger positioned adjacent an entrance to said cage; said auger including flighting and having flighting rotation means associated therewith; said auger also including a plurality of produce engaging flaps located at spaced intervals between said flighting.

6. The apparatus as set forth in claim 1 including:
(a) a central shaft rotatably mounted in said cage; said shaft including water supply means operably connected thereto and apertures therealong for selectively distributing water from said supply means to reduce dust within said cage.

7. The apparatus as set forth in claim 1 including:
(a) adjustable legs whereby the angle of the axis of rotation of said cage is adjustably relative to horizontal.

8. The apparatus as set forth in claim 7 wherein:
(a) said abrading surface is the outer surface of a plurality of rotating spindles; and
(b) said spindles are neutral directing such that rotation of said spindles does not urge produce that is in engagement with one of said spindles substantially in either direction along an axis of the spindle and said legs are modifiable to vary the angle of the axis of the cage at least in the range from 0° to 2° relative to horizontal such that produce is urged axially along the cage in direct proportion to the angle of the axis.

9. The apparatus as set forth in claim 1 including:
(a) a center shaft extending through said cage; and wherein:
(b) said center shaft is clad with a protective surface so as to prevent damage to produce in said cage.

10. An apparatus for removing dirt and peelings from produce; said apparatus comprising:
(a) a support frame;
(b) a cage rotatably mounted to rotate about a generally horizontal axis and supported by said frame; said cage having an interior chamber and an abrading surface facing said chamber for engaging the produce;
(c) rotating means rotating said cage, when said apparatus is operating, at a rotary speed sufficient to apply a centrifugal force at said surface that is at least greater than the force of gravity such that produce, when in said rotary cage is urged against said surface during a complete revolution of said cage and further such that the combined forces acting at said surface due to centrifugal and gravity forces varies substantially during each rotation, thereby reducing clustering of produce on said surface;
(d) feeding means for urging produce into said cage chamber;
(e) discharge means for transferring produce from said cage after being treated therein;
(f) a center shaft extending through said cage; and wherein:
(g) said center shaft is clad with a protective surface comprising an inflated air tube so as to prevent damage to produce in said cage.

11. An apparatus for removing dirt and peeling from produce; said apparatus comprising a rotating cage having an interior chamber with an abrading surface facing said chamber as well as means for transferring produce into said chamber and discharging produce from said chamber and means for rotating said cage; the improvement comprising:
(a) said cage being aligned such that the axis of rotation of said cage is generally horizontally aligned;
(b) said means for rotating said cage rotates said cage, when said apparatus is operating, at least at a speed sufficient to produce a centrifugal force acting at said abrading surface that is greater than the force of gravity during the entire rotation of said cage;
(c) whereby when said cage is rotated with produce therein, the produce is continuously urged against the abrading surface of said cage during each complete revolution thereof while the produce is within the cage, however, the combined force acting upon the produce due to gravity and to the centrifugal force varies substantially during each revolution.

12. An apparatus for removing peeling and dirt from produce comprising a rotary cage being aligned such that the axis of rotation of said cage is generally horizontally aligned and having abrading spindles thereon; said cage and said spindles rotated so as to be adapted to urge the produce against said spindles and to abrade the produce against the spindles and further to discharge dirt and peelings from the produce radially outward; said apparatus also including a drum positioned radially outward from said cage and having an interior surface thereof adapted to receive the dirt and peelings thereon; the improvement wherein:
(a) said drum interior surface diverges from one end thereof to a wide end thereof; said drum being positioned to receive dirt and peelings discharged radially outward from said spindles; and including (b) drum rotating means for rotating said drum such that peelings and dirt on said drum surface are urged along the drum surface toward and out of said drum wide end.

13. A method of removing and separating dirt and peeling form the surface of produce comprising the steps of:

(a) transferring said produce into a cage having an interior chamber with an abrading surface facing said chamber;

(b) rotating said cage with produce therein such that an axis of rotation of said cage is generally horizontally aligned and such that said produce is rotated at a sufficient velocity while against said surface to apply a combined force of greater than one g acting radially outward on said produce during the entire period the produce is within the cage; whereby said produce is urged against said surface by the combined force comprising gravity and a centrifugal force produced by said rotating such that said combined force varies substantially as said produce passes through one full revolution so as to reduce clustering of said produce within said cage and so as to urge the produce against the abrading surface substantially during the entire period the produce is within said cage;

(c) retaining said produce within said rotating cage for sufficient residence time for said abrading surface to act thereagainst and remove dirt and peeling therefrom; and (d) thereafter removing said produce from said cage.

14. The method according to claim 13 wherein:

(a) said cage is rotated at a sufficient velocity to produce a centrifugal force of approximately 3 to 7 gs acting at said abrading surface.

15. The method according to claim 14 wherein:

(a) said cage is rotated to produce a centrifugal force of approximately 5 gs whereby a variable combined force of from approximately 4 to 6 gs acts upon produce at said abrading surface during each complete revolution of said cage.

16. The method according to claim 14 including the steps of:

(a) providing a drum having a diverging interior surface in surrounding relationship to said cage such that said drum surface receives peelings and dirt removed from the produce by said abrading surface; and (b) rotating said drum so as to urge said peelings and dirt toward a wide end thereof.

* * * * *